United States Patent [19]

Wilson

[11] Patent Number: 5,197,805
[45] Date of Patent: Mar. 30, 1993

[54] TEMPERATURE SENSOR PROTECTION TUBE

[75] Inventor: Richard F. Wilson, Fort Wayne, Ind.

[73] Assignee: Pyromation, Inc., Fort Wayne, Ind.

[21] Appl. No.: 767,983

[22] Filed: Sep. 30, 1991

[51] Int. Cl.⁵ .................................................. G01K 1/12
[52] U.S. Cl. ................................... 374/208; 374/140; 136/230; 136/232; 136/234
[58] Field of Search ............... 374/139, 140, 158, 208, 374/209; 136/230, 232, 233, 234

[56] References Cited

U.S. PATENT DOCUMENTS

| Re. 26,409 | 6/1968 | Hance . | |
|---|---|---|---|
| 2,071,531 | 2/1937 | Hulme | 374/140 |
| 2,504,764 | 4/1950 | Vollrath | 136/234 X |
| 3,060,252 | 10/1962 | Willis . | |
| 3,264,874 | 8/1966 | Fischer . | |
| 3,329,534 | 7/1967 | Adler et al. | 136/233 |
| 3,560,282 | 2/1971 | Stark | 136/230 X |
| 3,580,744 | 5/1971 | Inouye et al. | 136/234 |
| 3,935,032 | 1/1976 | Brandeberry et al. | 136/230 |
| 4,135,538 | 1/1979 | Kurita | 136/234 |
| 4,216,028 | 8/1980 | Kurita | 136/234 |
| 4,377,347 | 3/1983 | Hanmyo et al. | 374/139 |
| 4,608,107 | 8/1986 | Falcomato | 156/190 |
| 4,721,533 | 1/1988 | Phillippi et al. | 136/234 |
| 4,721,534 | 1/1988 | Phillippi et al. | 136/234 |
| 4,749,416 | 6/1988 | Greenspan | 136/232 |
| 4,871,263 | 10/1989 | Wilson | 374/139 |

FOREIGN PATENT DOCUMENTS

| 2738926 | 6/1978 | Fed. Rep. of Germany . | |
| 507835 | 2/1956 | Italy . | |
| 0956324 | 4/1964 | United Kingdom | 136/234 |

Primary Examiner—William A. Cuchlinski, Jr.
Assistant Examiner—W. Morris Worth
Attorney, Agent, or Firm—Barnes & Thornburg

[57] ABSTRACT

A protective tube is provided for a temperature sensor. The protective tube includes an inner metal tube including a chamber for containing a temperature sensor, an intermediate refractory sleeve surrounding and abutting at least a portion of the inner metal tube, and an outer refractory sleeve cast onto the intermediate refractory sleeve. The outer refractory sleeve covers the intermediate refractory sleeve and the inner metal tube inside the intermediate refractory sleeve. The intermediate refractory sleeve is made of an elastic material such as a ceramic refractory paper or coating or a fiberglass material that deforms during expansion and contraction of the inner metal tube and the outer refractory sleeve with changing temperature. The intermediate refractory sleeve provides a buffer between the inner metal tube and the outer refractory sleeve to minimize rupture of the outer refractory sleeve which might otherwise occur during expansion and contraction of the tube and sleeve with changing temperature.

24 Claims, 1 Drawing Sheet

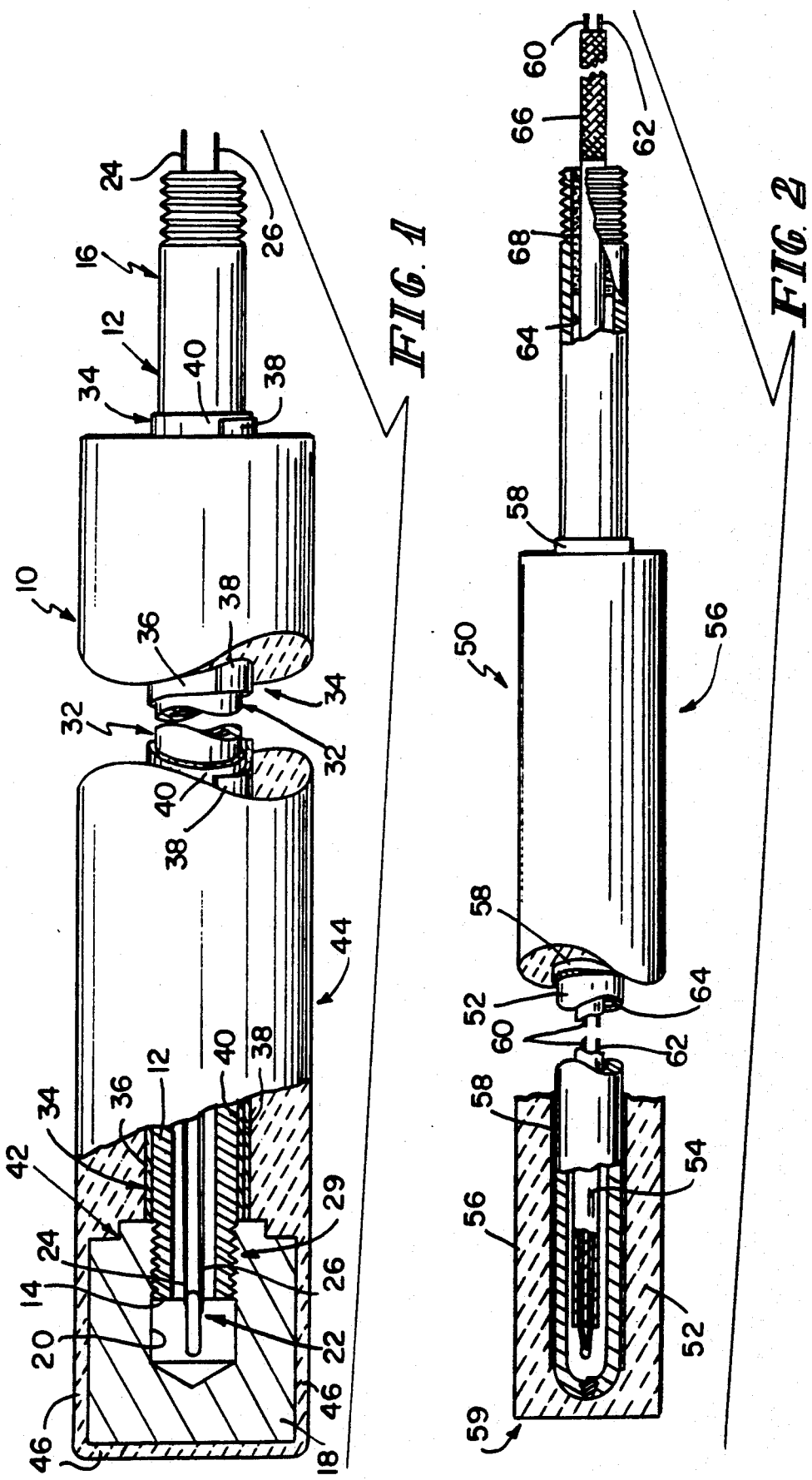

TEMPERATURE SENSOR PROTECTION TUBE

BACKGROUND AND SUMMARY OF THE INVENTION

This invention relates to a protective tube for a temperature sensor, such as a thermocouple assembly, which is used for measuring temperatures of a material, such as a molten metal. More particularly, this invention relates to a temperature sensor protection tube having a metal tube for housing a temperature sensor and a refractory material covering the metal tube.

It is often necessary to measure the temperature of molten metals, such as aluminum and steel, during production or other industrial processes. The temperatures encountered in these operations are quite high, typically ranging from 660° C. to 1,540° C. and higher. In addition, the corrosive nature of the metallurgical processes involved present problems which must be addressed in the design of protective apparatus for immersible temperature sensors. Materials such as slag and molten metal encountered in various metallurgical processes are corrosive and abrasive and can dissolve and erode protective devices used to cover and protect immersible temperature sensors.

It has been observed that protective tubes including a metal inner tube having a hollow region containing a temperature sensor and a refractory material casing surrounding the metal inner tube are reliable in operation, and relatively simple and inexpensive to manufacture. For example, U.S. Pat. No. 4,871,263 discloses a protective tube which protects a temperature sensor from a hostile molten metal environment and which allows the temperature sensor to respond rapidly to temperature changes of the material whose temperature is to be measured.

It has also been observed that the metal tube and ceramic refractory material used to construct practical and effective temperature sensor protection tubes expand and contract at different rates with changing temperature. This is because the metal in the inner tube and the ceramic refractory material in the outer casing have different coefficients of thermal expansion. Temperature variations cause dimensional changes in all materials. Most materials tend to expand in size when heated and contract in size when cooled. Within moderate ranges of temperature, the change in length per unit length is practically constant and is called the coefficient of thermal expansion.

Temperature sensor protection tubes are frequently exposed to rapid temperature changes whenever these tubes are immersed into a hot molten metal. The metal tube and ceramic refractory casing in the protective tube are subjected to appreciable changes in temperature. These elements expand and contract axially and radially at different rates and develop internal stresses of considerable magnitude during each cycle of temperature change.

An outer ceramic casing including in a temperature sensor protection tube can rupture if it is not able to expand or contract axially and radially somewhat relative to the other elements in the protection tube as the elements in the tube expand and contract with changing temperatures. For example, if the outer ceramic casing is bonded or fitted to an inner metal tube, it is restrained so as to prevent free thermal deformation. Large temperature changes in a restrained outer ceramic casing can produce critical internal stresses and even lead to rupture of the brittle refractory material used to form the sleeve.

There exists a need for a protective device for a temperature sensor which is able to withstand repeated rapid temperature changes without rupturing the brittle outer ceramic refractory casing. A protective device that is configured to permit an inner metal tube and an outer ceramic casing to expand and contract at different rates would be welcomed in the industry.

According to the present invention, a protective tube is provided for a temperature sensor. The protective tube includes an inner metal tube having a hollow region for containing a temperature sensor, an outer refractory sleeve surrounding the inner metal tube and forming an annular space therebetween, and an intermediate elastic buffer member positioned in the annular space to lie between the inner metal tube and the outer refractory sleeve. The intermediate elastic buffer member is made of a cushion material that deforms during expansion and contraction of the inner metal tube and the outer refractory sleeve with changing temperature to protect the brittle outer refractory sleeve from rupture.

In preferred embodiments, the inner metal tube is a steel pipe and the outer refractory sleeve is a cast ceramic refractory casing. The intermediate elastic buffer is either a ceramic paper wrapping, a ceramic refractory coating, or a preformed fiberglass sleeve. These buffers function to provide an elastic cushion between the metal inner tube and the outer refractory sleeve which permits the tube and sleeve to expand and contract at different rates during immersion of the protective tube assembly to high temperature molten metals and other materials. At the same time, the buffer provides a base on the exterior of the metal inner tube that permits the ceramic refractory sleeve to be cast in place without establishing a bond to or tight fit with the inner metal tube. Essentially, the ceramic refractory sleeve can be retained in place in the protective tube assembly in such a way that it is free to expand and contract at a rate different than the inner metal tube during repeated rapid temperature cycles. Advantageously, the improved protective tube assembly is configured to minimize ceramic rupture problems often caused by expansion and contraction of and internal stresses in elements used to construct the protective tube assembly.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is a partial cross-sectional side view of a protective tube assembly according to certain preferred embodiments of the present invention; and FIG. 2 is a partial cross-sectional side view of a protective tube assembly according to other preferred embodiments of the present invention.

DETAILED DESCRIPTION OF THE DRAWINGS

A first preferred embodiment of a protective tube assembly 10, constructed in accordance with the present invention, for receiving and protecting a temperature sensor such as a thermocouple assembly, is shown in FIG. 1. A metal inner tube 12 has an open end 14 on an immersible end thereof, and an open end 16 on an opposite non-immersible end. Metal inner tube 12 can be made of several materials including, by way of example only, carbon steel, stainless steel, or nickel alloy steel. A commercially available tubing or pipe of standard dimensions can be used.

A thermally conductive plug 18 is mounted on the metal inner tube 12 so that an inner bore 20 formed in the thermally conducted plug 18 is arranged to contain a temperature sensor 22 therein. Thus, inner bore 20 extends outwardly from the open end 14 of the metal inner tube 12. As shown in FIG. 1, plug 18 can include internal threads that mate with external threads on the open end 14 of metal inner tube 12 to establish a threaded connection 29. Reference is hereby made to U.S. Pat. No. 4,871,263 for a description of other suitable plug-mounting techniques. During assembly, the temperature sensor 22 and its wire leads 24, 26 are passed through the passageway extending through the metal inner tube 12 and the open mouth of open end 14 to reach the bore 20 formed in thermally conductive plug 18.

Several different types of thermally conductive materials can be used to construct plug 18. However, the use of graphite or silicon carbide is preferred. Specific examples of such materials which may be used are Union Carbide Corp. Type AGSR or AGSX graphite material and products sold by Ferro Corporation, such as silicon nitride bonded silicon carbide, KELLOGG 3AD silicate bonded silicon carbide or recrystallized silicon carbide. Such a plug 18 will provide fast thermal response to process temperature changes.

Much of the exposed exterior surface 32 of metal inner tube 12 that extends outwardly from the inner bore 20 in thermally conductive plug 18 is surrounded and covered with a thin buffer or cushion 34 as shown, for example, in FIG. 1. In the preferred embodiment illustrated in FIG. 1, cushion 34 is a ceramic refractory paper 36 wrapped around the exposed exterior surface 32 of metal inner tube 12. As shown in FIG. 1, one edge 38 of paper 36 is wrapped to overlap another edge 40 of paper 36 during installation of the paper 36 on the metal inner tube 12. These edges 38 and 40 can either be secured in place with fiberglass tape (not shown) or left unbonded to one another to permit paper 36 to swell or move somewhat to enhance the buffering or cushioning effects provided by cushion 34. Several different types of ceramic refractory paper can be used to provide a suitable elastic cushion means around metal inner tube 12 and accommodate repeated expansion and contraction of metal inner tube 12 with changing temperatures. For example, FIBERFRAX -Ceramic Fiber Paper Nos. 970 and 550, available from Carborundum Company, Refracturies Division, Sanborn, N.Y., provide suitable elastic buffers. The cushion established by such a ceramic refractory paper 36 is about 1/16" thick when wrapped about a metal inner tube 12 having an outer diameter of about 0.500 inches.

In another embodiment (not shown), a ceramic refractory coating can be used in lieu of ceramic refractory paper 36. For example, a thin coating of THERMBRAKE 2X, available from Stellar Materials, Detroit, Mich., could be used to provide a suitable buffer or cushion around metal inner tube 12. Also, a preformed fiberglass sleeve of the type shown in FIG. 2 could also be used. For example, a fiberglass sleeve, available from Varflex Corporation, Rome, N.Y., could be used in lieu of either the ceramic refractory paper 36 or coating (not shown).

In the preferred embodiment shown in FIG. 1, metal inner tube 12 has an outside diameter which is substantially constant over the length of the tube 12. The outer diameter of the thermally conductive plug 18 is larger than the outer diameter of the tube 12 and the plug 18 includes a stepped shoulder 42 adjacent to cushion 34.

An outer ceramic refractory sleeve 44 surrounds and envelopes the metal inner tube 12 and the thermally conductive plug 18. As shown in FIG. 1, only a very thin coating 46 of ceramic refractory material in sleeve 44 covers the major portion of thermally conductive plug 18 to enhance exposure of plug 18 to the temperature of the material to be measured when the protective tube 10 is immersed.

According to certain preferred embodiments, the sleeve means 44 is a refractory ceramic fiber material that is cast onto the plug 18 and the cushion 34 covering the metal inner tube 12 to provide the ceramic refractory casing for the protective tube assembly 10. Examples of suitable refractory ceramic fiber materials to form sleeve 44 include THERMBOND 2800 85 refractory, available from Steller Materials Incorporated of Detroit, Mich.; PLICAST AL-TUFF 85 EX, available from PLIBRICO of Chicago, Ill.; and ALUGARD 75 LW, available from C-E Refractories of Valley Forge, Pa. A variety of other commercially available ceramic refractory materials are suitable.

As shown in FIG. 1, the cushion 34 occupies the annular space provided between the exterior surface of the inner metal tube 12 and the interior surface of the cast ceramic refractory sleeve 44. The cushion 34 is made of a resilient and elastic material that deforms during expansion and contraction of the inner metal tube 12 and the outer refractory sleeve 44 with changing temperature. This deformation allows the inner metal tube 12 to expand and contract relative to the surrounding outer refractory sleeve 44 without applying radially outwardly directed forces sufficient to rupture the brittle refractory sleeve 44. Also, the sleeve 44 is not restrained by the inner metal tube 12 or any adhesive bonds or close fits from undergoing substantially free thermal deformation. This freedom of the sleeve 44 to expand and contract during exposure to repeated and rapid temperature changes help to minimize the development of thermal loads or internal stresses in sleeve 44. As noted above, large temperature changes in a restrained ceramic refractory piece can produce critical internal stresses and even cause rupture of the brittle refractory material used to form the sleeve 44.

In other embodiments (not shown), other materials may be used to provide a buffer between the inner metal tube 12 and the outer refractory sleeve 44 to provide, in effect, a thermal expansion joint between tube 12 and sleeve 44. For example, a crushable or compressible material could be used as a buffer layer in lieu of an elastic material. Such a crushable material would deform at least during expansion of the tube 12 and sleeve 44 with hotter temperatures but would not necessarily recover its original shape fully during subsequent contraction of the tube 12 and sleeve 44 with cooler temperatures. This type of crushable buffer could provide a suitable cushion layer between tube 12 and sleeve 44 in applications where the temperature sensor is designed for only one exposure or a few exposures to high temperatures.

Another embodiment of the invention is shown in FIG. 2. In this embodiment, a disposable temperature sensor protection tube assembly 50 is disclosed. This assembly 50 is intended primarily for use in molten non-ferrous metals, specifically for molten aluminum and zinc. Of course, a protection tube of this type could be provided for protecting a wide variety of temperature sensors and immersibles into many high temperature materials.

As shown in FIG. 2, the assembly 50 includes an inner metal tube 52 containing a temperature sensor 54 such as a thermocouple, an outer refractory sleeve 56, and an intermediate layer of fiberglass material 58 to provide a buffer between the inner metal tube 54 and the outer refractory sleeve 56. In this embodiment, the immersible end 59 of the inner metal tube 52 is welded closed as shown in FIG. 2 so that it is not necessary to close an open end of the inner metal tube with a graphite plug of the type shown in the embodiment of FIG. 1. Preferably, the inner metal tube 52 is a carbonized or stainless steel and the outer refractory sleeve 56 is a cast ceramic material.

A preformed fiberglass tube 58 provides an elastic buffer between the inner metal tube 12 and the outer refractory casing 56. As noted above, fiberglass tube, available from Varflex Corporation of Rome, N.Y., are well suited for this purpose. Such a tube deforms and recovers its shape during expansion and contraction of the inner metal tube 52 and the outer refractory casing 56 to minimize the possibility that casing 56 might rupture during exposure to changing temperatures. A ceramic refractory material is cast in place about the inner metal tube 52 and the intermediate fiberglass buffer 58 to produce the outer ceramic casing 56.

Wire leads 60, 62 extend through the passage 64 formed in the inner metal tube 52 from the temperature sensor 54 to a point outside of the inner metal tube 52 as shown in FIG. 2. These wire leads 60, 62 are covered with insulation 66. A plug 68 of high temperature ceramic cement is used to hold the wiring assembly 66 in place inside inner metal tube 52. This plug 68 is used in lieu of weldment and seals the inside of the tube 52 to protect the thermocouple.

This assembly 50 provides good resistance to thermal shock, mechanical breakage, and to penetration by molten aluminum and zinc. Its small diameter also provides fast thermal response to process temperature changes.

Although the invention has been described in detail with reference to preferred embodiments and specific examples, variations and modifications exist within the scope and spirit of the invention as described and as defined in the following claims.

What is claimed is:

1. A protective tube for a temperature sensor, the protective tube comprising
   means for containing a temperature sensor, the containing means including a thermally conductive plug formed to include an inner bore sized to receive a temperature sensor therein and an inner metal tube formed to include an internal passageway sized to receive temperature sensor lead wires therein and coupled to the thermally conductive plug to cause the internal passageway to open into the internal bore, the inner metal tube being made of a metal having a first coefficient of thermal expansion, outer refractory sleeve means for surrounding the thermally conductive plug and at least a portion of the inner metal tube, the outer refractory sleeve means being made of a ceramic refractory material having a second coefficient of thermal expansion that is different than the first coefficient of thermal expansion, and buffer means for establishing a buffer between the outer refractory sleeve means and the inner metal tube to separate the outer refractory sleeve means and the inner metal tube and permit expansion and contraction of the outer refractory sleeve means and the inner metal tube with changing temperature so that each of the inner metal tube and the outer refractory sleeve means can expand and contract independently upon exposure to changing temperature without rupturing the outer refractory sleeve means to accommodate the differential thermal expansion rates of the inner metal tube and the outer refractory sleeve means.

2. The protective tube of claim 1, wherein the inner metal tube is a steel pipe.

3. The protective tube of claim 2, wherein the outer refractory sleeve means is a ceramic tube having a first bore containing the thermally conductive plug and a second bore containing the steel pipe and the outer diameter of the steel pipe is less than the inner diameter of the second bore to define a space between the steel pipe and the ceramic tube.

4. The protective tube of claim 3, wherein the buffer means is a deformable cushion located in the space to abut the steel pipe and the ceramic tube and configured to yield during expansion and contraction of the steel pipe and the ceramic tube to shield the ceramic tube during exposure of the steel pipe and the ceramic tube to a series of temperature change cycles.

5. The protective tube of claim 3, wherein the buffer means is an elastic ceramic paper in the space between the steel pipe and the ceramic tube.

6. The protective tube of claim 3, wherein the buffer means is an elastic refractory material layer in the space between the steel pipe and the ceramic tube.

7. The protective tube of claim 3, wherein the buffer means is a preformed fiberglass sleeve in the space between the steel pipe and the ceramic tube.

8. The protective tube of claim 1, wherein the buffer means surrounds and abuts at least a portion of the inner metal tube and the ceramic refractory material is cast onto the thermally conductive plug and the buffer means to establish the outer refractory sleeve and cover the thermally conductive plug and the buffer means.

9. The protective tube of claim 8, wherein the buffer means is an elastic ceramic paper wrapping surrounding the inner metal tube.

10. The protective tube of claim 8, wherein the buffer means is an elastic refractory material coating surrounding the inner metal tube.

11. The protective tube of claim 8, wherein the buffer means is a preformed fiberglass sleeve surrounding the inner metal tube.

12. The protective tube of claim 1, wherein the buffer means is a deformable cushion abutting the inner metal tube and the refractory sleeve means.

13. The protective tube of claim 12, wherein the deformable cushion includes a first exterior surface abutting the inner metal tube, a second exterior surface abutting the outer refractory sleeve means, and an elastic core located between the first and second exterior surfaces and configured to deform during expansion and contraction of the inner metal tube and the outer refractory sleeve means.

14. The protective tube of claim 1, wherein the buffer means is an elastic ceramic paper wrapping surrounding the inner metal tube.

15. The protective tube of claim 1, wherein the buffer means is an elastic refractory material coating surrounding the inner metal tube.

16. The protective tube of claim 1, wherein the buffer means is a fiberglass material surrounding the inner metal tube.

17. A protective tube for a temperature sensor, the protective tube comprising.
   an inner metal tube,
   a thermally conductive plug formed to include an inner bore sized to receive the temperature sensor,
   outer refractory sleeve means for surrounding the thermally conductive plug and at least a portion of the inner metal tube the outer refractory sleeve means being made of a ceramic refractory material, and
   buffer means for abutting each of the inner metal tube and the outer refractory sleeve means and for permitting relative expansion and contraction of the inner metal tube and the outer refractory sleeve means with changing temperature so that the inner metal tube and the outer refractory sleeve means can expand and contract during exposure to a series of temperature change cycles without rupturing the outer refractory sleeve means, wherein the buffer means is an elastic ceramic paper wrapping surrounding the inner metal tube means.

18. The protective tube of claim 17, wherein the inner metal tube includes an exterior surface, the outer refractory sleeve means includes an interior surface located in spaced relation to the exterior surface of the inner metal tube to define an annular buffer zone therebetween, and the buffer means is arranged to fill the buffer zone to abut the exterior surface of the inner metal tube and the interior surface of the outer refractory sleeve means.

19. The protective tube of claim 17, wherein the inner metal tube is a steel pipe.

20. The protective tube of claim 19, wherein the outer refractory sleeve means is a ceramic tube having a bore containing the steel pipe.

21. A protective tube for a temperature sensor, the protective tube comprising
   means for containing a temperature sensor, the containing means including an inner hollow metal tube and a plug having an inner bore with both the bore and tube hollow being sized to receive the temperature sensor therein,
   an outer refractory sleeve surrounding the plug and at least a portion of the inner metal tube and forming an annular space between the inner metal tube and the outer refractory sleeve,
   the outer refractory sleeve being made of a ceramic refractory material, and
   an intermediate elastic buffer means lying in the annular space and deforming during expansion and contraction of the inner metal tube and the outer refractory sleeve with changing temperature.

22. A protective tube for a temperature sensor, the protective tube comprising
   means for containing a temperature sensor, the containing means including an inner hollow metal tube and an attached plug with an internal passageway therein,
   an outer refractory sleeve surrounding the plug and at least a portion of the inner metal tube and forming an annular space between the inner metal tube and the outer refractory sleeve,
   the outer refractory sleeve being made of a ceramic refractory material, and
   an intermediate elastic buffer means lying in the annular space and deforming during expansion and contraction of the inner metal tube and the outer refractory sleeve with changing temperature, the buffer means being an elastic ceramic paper wrapping surrounding and abutting the inner metal tube.

23. The protective tube of claim 22, wherein the outer refractory sleeve is a ceramic refractory material cast onto the elastic ceramic paper wrapping to enclose a portion of the inner metal tube and intermediate elastic buffer means therein.

24. The protective tube of claim 21, wherein the outer refractory sleeve is a ceramic refractory material cast onto the elastic ceramic paper wrapping.

* * * * *